United States Patent
Devkar et al.

(10) Patent No.: US 9,436,756 B2
(45) Date of Patent: Sep. 6, 2016

(54) MEDIA SYSTEM FOR GENERATING PLAYLIST OF MULTIMEDIA FILES

(71) Applicants: Sujit Devkar, Thane (IN); Pankaj Doke, Thane (IN); Vinayak Iyer, Thane (IN); Kushal Gore, Thane (IN); Sylvan Lobo, Thane (IN); Apurv Nigam, Thane (IN); Praveen Sunka, Thane (IN); Priyanka Chandel, Thane (IN); Sanjay Kimbahune, Thane (IN); Ravichander Karthik Chittur, Thane (IN); Ramiz Raza, Thane (IN)

(72) Inventors: Sujit Devkar, Thane (IN); Pankaj Doke, Thane (IN); Vinayak Iyer, Thane (IN); Kushal Gore, Thane (IN); Sylvan Lobo, Thane (IN); Apurv Nigam, Thane (IN); Praveen Sunka, Thane (IN); Priyanka Chandel, Thane (IN); Sanjay Kimbahune, Thane (IN); Ravichander Karthik Chittur, Thane (IN); Ramiz Raza, Thane (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 178 days.

(21) Appl. No.: 14/166,578

(22) Filed: Jan. 28, 2014

(65) Prior Publication Data

US 2014/0214848 A1    Jul. 31, 2014

(30) Foreign Application Priority Data

Jan. 28, 2013    (IN) .......................... 247/MUM/2013

(51) Int. Cl.
*G06F 17/30* (2006.01)
(52) U.S. Cl.
CPC ... *G06F 17/30598* (2013.01); *G06F 17/30029* (2013.01); *G06F 17/30053* (2013.01)

(58) Field of Classification Search
CPC .................. G06F 17/30053; G06F 17/30598; G06F 17/30029
USPC ........................................................ 707/740
See application file for complete search history.

(56) References Cited

U.S. PATENT DOCUMENTS

| 7,728,735 | B2 | 6/2010 | Aaron et al. |
| 8,004,391 | B2 | 8/2011 | Hernandez et al. |
| 2006/0005226 | A1* | 1/2006 | Lee .................. G06F 17/30029 725/141 |
| 2006/0143647 | A1* | 6/2006 | Bill .................. G06F 17/30743 725/10 |
| 2006/0170945 | A1* | 8/2006 | Bill .................. G06F 17/30749 358/1.13 |

(Continued)

FOREIGN PATENT DOCUMENTS

EP    1791046 A1    5/2007

OTHER PUBLICATIONS

Joris H. Janssen, Egon L. Van Den Broek, and Joyce H. D. M.Westerink, "Tune in to your emotions: a robust personalized affective music player", User Model User-Adap Inter, Received Aug. 5, 2010/Accepted Aug. 18, 2011.

(Continued)

*Primary Examiner* — Joshua Bullock
(74) *Attorney, Agent, or Firm* — Ditthavong & Steiner, P.C.

(57) ABSTRACT

Disclosed is a method and system for dynamically generating a playlist of multimedia files for a user based upon a mood of the user. The system comprises a mood detection module, a tag allocation module, and a playlist generation module. The mood detection module is configured to determine the mood of the user based upon the one or more emotion tags allocated to records of the user. The tag allocation module is configured to categorize the at least one multimedia file under one or more emotion tags based upon the weights assigned to the one or more emotion tags. The playlist generation module is configured to dynamically generate the playlist of multimedia files based upon the mood of the user and the categorization of the at least one multimedia file under one or more emotion tags.

14 Claims, 8 Drawing Sheets

(56) References Cited

U.S. PATENT DOCUMENTS

| | | | |
|---|---|---|---|
| 2008/0201370 A1* | 8/2008 | Kemp | G06F 17/30017 |
| 2009/0002178 A1 | 1/2009 | Guday et al. | |
| 2009/0069914 A1* | 3/2009 | Kemp | G10H 1/0008 |
| | | | 700/94 |
| 2009/0234718 A1 | 9/2009 | Green | |
| 2010/0011388 A1* | 1/2010 | Bull | H04N 21/41407 |
| | | | 725/9 |
| 2010/0325135 A1* | 12/2010 | Chen | G06F 17/30053 |
| | | | 707/759 |
| 2011/0283190 A1 | 11/2011 | Poltorak | |
| 2012/0179751 A1* | 7/2012 | Ahn | G06Q 50/01 |
| | | | 709/204 |
| 2012/0233164 A1* | 9/2012 | Rowe | G06F 17/30743 |
| | | | 707/737 |
| 2013/0222270 A1* | 8/2013 | Winkler | H04M 1/0233 |
| | | | 345/173 |

OTHER PUBLICATIONS

S. Dornbush, K. Fisher, K. Mckay, A. Prikhodko, and Z. Segall, "Xpod—A Human Activity and Emotion Aware Mobile Music Player", University of Maryland Baltimore County, United States, Available at http://ebiquity.umbc.edu/file_directory_/papers/234.pdf, retrieved on Jan. 28, 2014.

Yisi Liu, Olga Sourina, and Minh Khoa Nguyen, "Real-time EEG-based Emotion Recognition and its Applications", Nanyang Technological University, Singapore, Available at http://www3.ntu.edu.sg/home/eosourina/Papers/RealtimeEEGEmoRecog.pdf, retrieved on Jan. 28, 2014.

Luca Chiarandini, Massimiliano Zanoni, and Augusto Sarti, "A System for Dynamic Playlist Generation Driven by Multimodal Control Signals and Descriptors", Yahoo! Research Barcelona, Catalunya (Spain), Italay, MMSP'10, Oct. 4-6, 2010, Saint-Malo, France, Available at http://grupoweb.upf.edu/~luca.chiarandini/personal/v0/files/2011-mmsp.pdf, retrieved on Jan. 28, 2014.

Fabrice Forest, Astrid Oehme, Karim Yaici, and Céline Verchère-Morice, "Psycho-Social Aspects of Context Awareness in Ambient Intelligent Mobile Systems", Available at http://ist-esense.org/fileadmin/images/PDF_Other/IST_SUMMIT_2006/2.a_e.pdf, retrieved on Jan. 28, 2014.

* cited by examiner

MEDIA SYSTEM FOR GENERATING PLAYLIST OF MULTIMEDIA FILES

RELATED APPLICATIONS

This application claims the benefit of the earlier filing date under 35 U.S.C. §119(a) of Indian Application Serial No. 247/MUM/2013 filed Jan. 28, 2013, the entirety of which is incorporated herein by reference.

TECHNICAL FIELD

The present subject matter described herein, in general, relates to media systems, and more particularly to media systems for generating playlists of multimedia files.

BACKGROUND

In the era of media systems, being capable of residing in computing devices such as, smart phones, the users of such computing devices are engrossed in multimedia that keeps the users busy and entertained. The users use their media systems to play music, video, and other multimedia. The multimedia may be stored as multimedia files in a multimedia database residing either on user's media system or on online media stores. Using the multimedia database, the users may create their own playlists of multimedia files being preferred by the users.

Conventionally, the users manually create playlists by selecting individual multimedia files stored in the multimedia database. Further, the users may also create playlists specifying certain conditions such as, 'Sad Songs' or 'Patriotic Songs' in the media systems. The media systems, based upon such conditions, fetch multimedia files from the multimedia database and generate a playlist accordingly.

Although the creation of the playlist is automated after the user specifies the condition(s), the playlist that is created is a static playlist. In other words, the playlist is not updated as and when new multimedia files are added on to the multimedia database. Therefore, gradually the playlist created by the users becomes obsolete. In such a scenario, as the user might not be interested in the playlist which is preexisting in the media system, the user may either manually add new multimedia files to the playlist or may again specify a condition to create a new playlist.

SUMMARY

This summary is provided to introduce concepts related to systems and methods for dynamically generating a playlist of multimedia files for a user and the concepts are further described below in the detailed description. This summary is not intended to identify essential features of the claimed subject matter nor is it intended for use in determining or limiting the scope of the claimed subject matter.

In one implementation, a media system for dynamically generating a playlist of multimedia files for a user based upon a mood of the user is disclosed. The media system comprises a processor and a memory coupled to the processor for executing a plurality of modules present in the memory. The plurality of modules comprises a mood detection module, a tag allocation module, and a playlist generation module. The mood detection module is configured to mine records associated with the user from one or more sources such as, social media, a personal information database, and a stream database associated with the user. The mood detection module is further configured to allocate one or more emotion tags to the records mined from the one or more sources. Moreover, the mood allocation module is further configured to determine the mood of the user based upon the one or more emotion tags allocated to the records. The tag allocation module, on the other hand, is configured to associate the at least one multimedia file with a vector. The tag allocation module is further configured to compare each word of content of the least one multimedia file with each keyword present in predefined lists of keywords. The predefined list of keywords is indicative of an emotion. Further, the vector is indicative of a relationship of each word of the at least one multimedia file with the each emotion. The tag allocation module is further configured to allocate one or more emotion tags to the at least one multimedia file based upon the comparison. The tag allocation module is further configured to assign weights to each of the one or more emotion tags allocated to the at least one multimedia file. The weights are assigned based upon relevance of the content of the at least multimedia file to the one or more emotion tags. The tag allocation module is further configured to categorize the at least one multimedia file under one or more emotion tags based upon the weights assigned to the one or more emotion tags. The playlist generation module is configured to dynamically generate the playlist of multimedia files based upon the mood of the user and the categorization of the at least one multimedia file under one or more emotion tags.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for dynamically generating a playlist of multimedia files are described. The playlist of the multimedia files may keep on updating dynamically based upon a mood of the user. The present subject matter discloses an effective and efficient mechanism for determining the mood of the user expressed on various sources, such as social networking sites. Based upon the mood of the user, a playlist suitable to the mood may be generated. In one example, a playlist of sad songs or sad videos may be generated automatically when the user is determined to be sad. Subsequently, if the user becomes happy and/or romantic, the playlist may be automatically changed to contain happy and/or romantic songs and/or videos. Therefore, the playlist may be dynamically updated/generated based upon user's mood.

In order to generate such a playlist, at first, the mood of the user may be determined by mining records associated with the user from one or more sources such as, social media, a personal information database, and a stream database. Specifically, the records may contain certain words which may be indicative of the mood of the user. For example, a post by the user on a social networking platform may be indicative of happiness. Based upon this post, the user may be determined to be happy.

Subsequent to the mood determination of the user, the multimedia files available offline or online may be liked with certain emotion tags. In one example, the multimedia files available online may be retrieved and analyzed. Specifically, content of the multimedia files may be analyzed to determine one or more emotion tags suitable for the multimedia file. For example, if a song contains sad words, then the song is allocated an emotion tag called 'sad'. Similarly, all multimedia files are linked to one or more emotion tags for facilitating generation of a suitable playlist of multimedia files.

After all the multimedia files are linked to one or more emotion tags, a playlist may be generated based upon the user's mood and the emotion tags associated with the multimedia files.

While aspects of described system and method for dynamic generation of a playlist of multimedia files based on the user's mood may be implemented in any number of different computing systems, environments, and/or configurations, the embodiments are described in the context of the following exemplary system.

Figure 1:
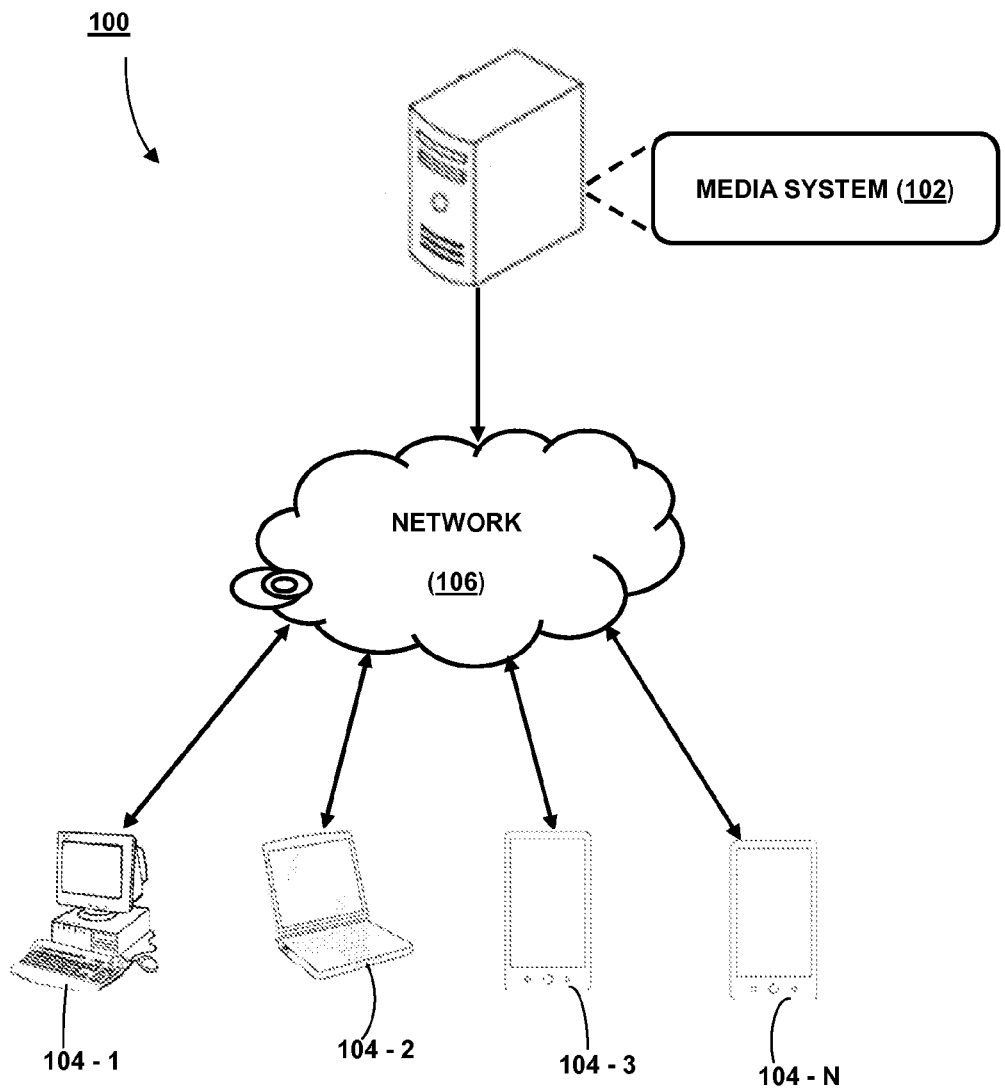
FIG. 1 illustrates a network implementation of a media system for dynamically generating a playlist of multimedia files is shown, in accordance with an embodiment of the present subject matter.

Referring now to FIG. 1, a network implementation 100 of a media system 102 for dynamically generating a playlist of multimedia files is illustrated, in accordance with an embodiment of the present subject matter. In one embodiment, the media system 102 provides for dynamic, i.e. on the run creation and modification of playlists based on the user's mood. In one embodiment, the media system 102 determines the mood of the user based upon user's visits and posts on various social media and also based upon user's health parameters. After determining the mood of the user, the media system 102 may allocate emotion tags to the multimedia files available offline or online. Based upon the user's mood and the emotion tags associated with the multimedia files, the media system 102 may generate a playlist of multimedia files suitable to the mood of the user. The playlist may keep on changing dynamically as and when the mood the user changes.

Although the present subject matter is explained considering that the media system 102 is implemented as a music player on a server, it may be understood that the media system 102 may also be implemented in a variety of computing systems, such as a laptop computer, a desktop computer, a notebook, a workstation, a mainframe computer, a server, a network server, and the like. It will be understood that the media system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the media system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
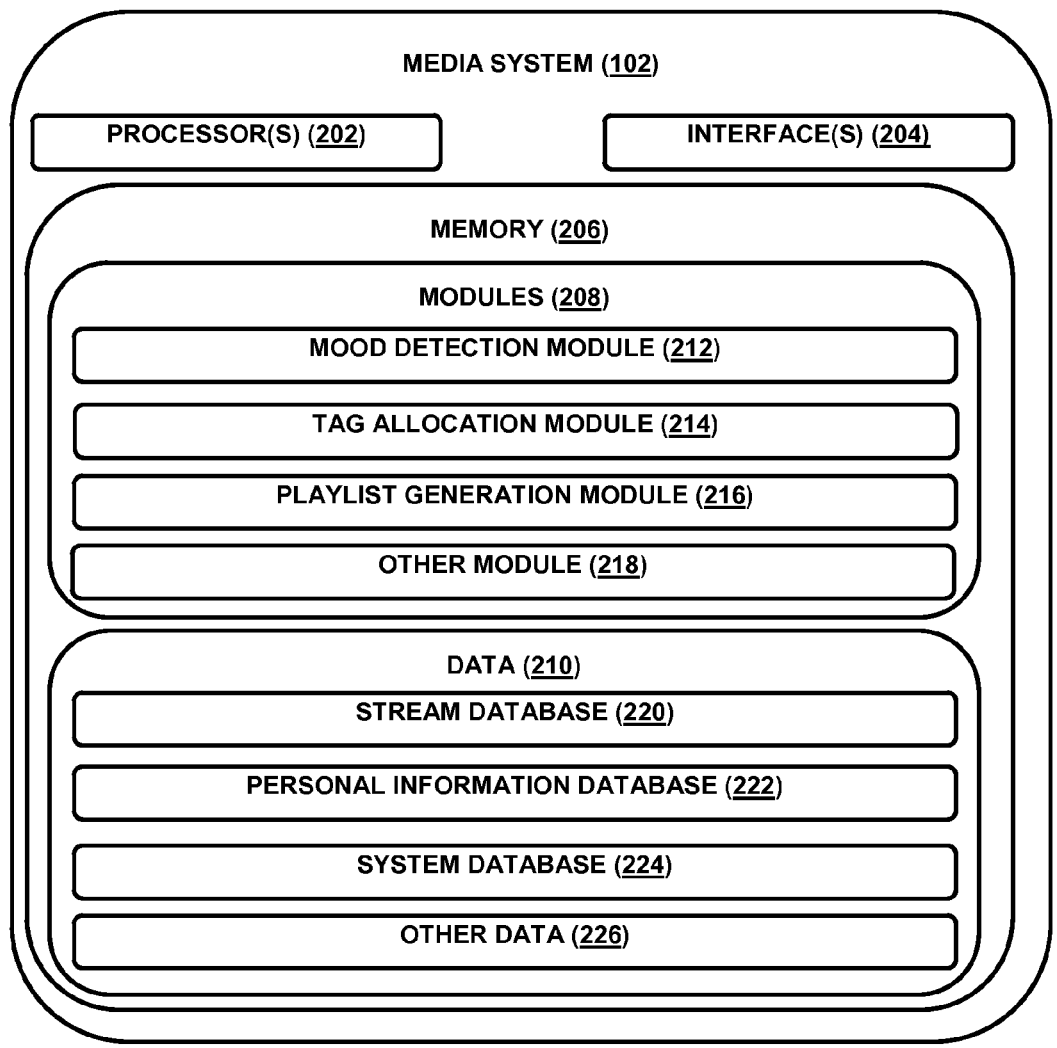
FIG. 2 illustrates the media system, in accordance with an embodiment of the present subject matter.

Referring now to FIG. 2, the media system 102 is illustrated in accordance with an embodiment of the present subject matter. In one embodiment, the media system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the media system 102 to interact with a user directly or through the client devices 104. Further, the I/O interface 204 may enable the media system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a mood detection module 212, a tag allocation module 214, a playlist generation module 216, and other modules 218. The other modules 218 may include programs or coded instructions that supplement applications and functions of the media system 102.

The data 210, amongst other things, serves as a repository for storing data processed, received, and generated by one or more of the modules 208. The data 210 may also include a stream database 220, a personal information database 222, a system database 224, and other data 130. The other data 130 may include data generated as a result of the execution of one or more modules in the other module 218.

In one implementation, at first, a user may use the client device 104 to access the media system 102 via the I/O interface 204. The user may register themselves using the I/O interface 204 in order to use the media system 102. The working of the media system 102 may be explained in detail in FIGS. 3 and 4 explained below. The media system 102 may be used for dynamically generating a playlist of multimedia files. In order to generate the playlist of multimedia files, the media system 102, at first, determines the mood of the user. Specifically, in the present implementation, the mood of the user is determined by the mood detection module 212.

MOOD DETECTION MODULE

Figure 3:
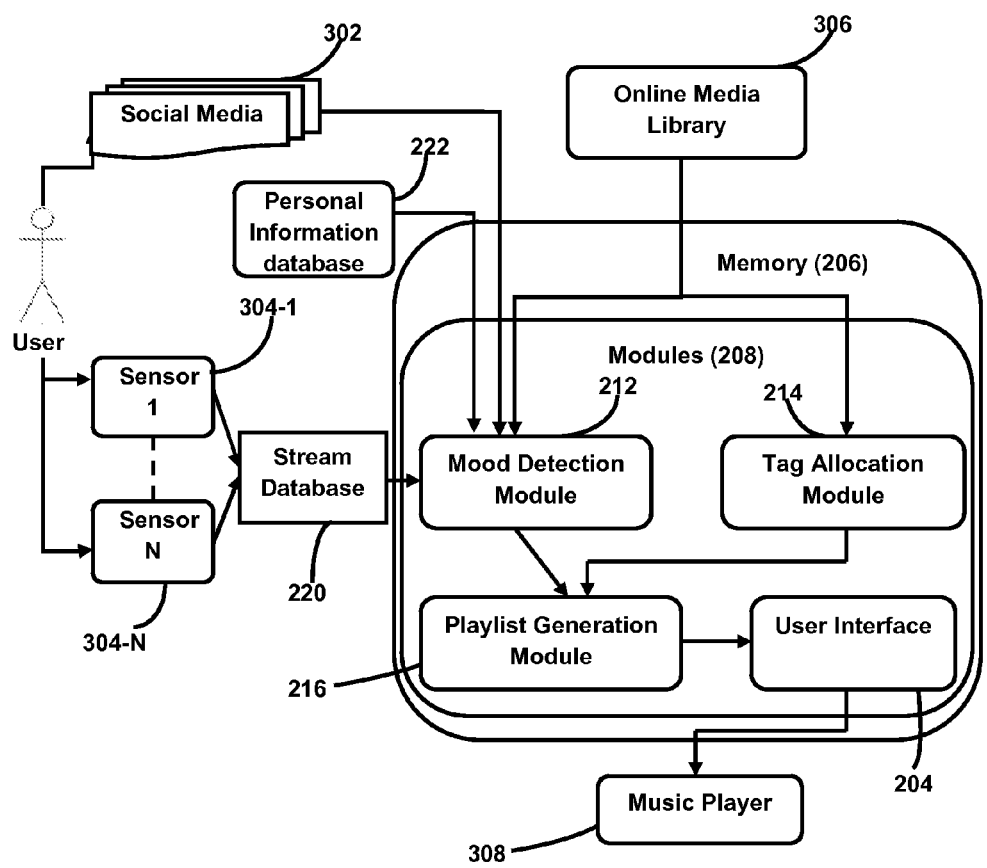
FIG. 3 illustrates a detailed working of the media system, in accordance with an embodiment of the present subject matter.

Referring to FIG. 3, a detailed working of the mood detection module 212 along with the working of other components of the media system 102 is illustrated, in accordance with an embodiment of the present subject matter. In one implementation, in order to determine the mood of the user, the mood detection module 212 may, at first, mine records associated with the user from one or more sources such as, social media 302, the stream database 220, and the personal information database 222.

In one implementation, the mood detection module 212 may access user's profile on the social media 302 for mining records. Examples of social media 302 may include social networking websites, feedback/review collection websites, and blogs. A list of social media 302 may be provided by the user at the time of registration and such list of social media 302 may be stored in the system database 224. Further, the user may also permit the mood detection module 212 for mining the records from websites named in the list of social media 302.

The records mined from the social media 302 by the mood detection module 212 may comprise user's activity information such as posts, updates, articles, and comments provided by the user on the social media 302. It may be understood that the activity information of the user may also obtained from profiles of people known to the user. Further, it may be understood that the user may express their emotions such as, happiness, sadness, excitement, and patriotism in forms of status updates, comments, and posts on the social media 302. The records from the social media 302 may be indicative of user's mood. For example, the user may post on a social networking website that 'I am happy as I bought a new car.' The above mentioned post may indicate that the user is excited and/or happy.

After mining the records from the first source, the mood detection module 212 may mine records from a second source, i.e., the stream database 220. The stream database 220 is coupled to a plurality of biological sensors 304-1 . . . 304-N whose output is stored in the stream database 220. In one embodiment, the plurality of biological sensors 304-1 . . . 304-N, together referred to as biological sensors 304, may be attached to a body of the user. Examples of the biological sensors 304 may include electro-cardiogram sensor, a piezo film sensor, a thermal sensor, and an electro-encephalogram sensor. The biological sensors 304 may monitor and capture health parameters such as, blood-pressure, heartbeat rate, and body temperature of the user. Subsequent to capturing the health parameters, the biological sensors 304 sends the health parameters to the stream database 220 for storage. The health parameters stored in the stream database 220 may be mined by the mood detection module 212. The health parameters so mined may assist in determining the mood of the user as the health parameters of the body may vary based upon various moods of the user. For example, in case the user has bought a new car, his heart beat may be a little faster than normal, thereby indicating excitement.

After mining the records from the second source, the mood detection module 212 may mine records from a third source, i.e., the personal information database 222. The personal information database 222 may include personal information pertaining to age, e-mail, web-browsing history, peers, Rich Site Summary (RSS) feeds, and environment associated with the user. The personal information may also assist in determining the mood of the user. For example, if the user is young and has bought a car, he may be happy and excited; whereas if an eighty year old person buys a car, he may still be calm, poised, and happy but not excited. Similarly, the web-browsing history and environment of the user may also assist in determining the mood of the user. For example, if the user browses for latest gadgets or cars, he might be happy and excited; whereas if the user browses history of freedom fighters, he might be feeling patriotic. Therefore, personal information database 222 too plays a role in determination of mood of the user.

It may be understood that after collating records from the social media 302, the stream database 220, and the personal information database 222, the mood detection module 212 may allocate one or more emotion tags to the records. In one example, the emotion tags are stored in the system database 224 in a form of a set of emotions. The set of emotions may include tags for several emotions, such as happy, sad, patriotic, excited, motivational, and romantic. For understanding, hereafter the emotions are expressed in terms of E1, E2, to Em, i.e., the emotion happy is equivalent to E1, the emotion sad is equivalent to E2, and so on.

In the present embodiment, each emotion is associated with a list of predefined keywords indicative of that emotion. For example, the emotion 'happy,' i.e., E1 is associated with a list L1 of predefined keywords including words, such as good news, bought, blessed, content, bliss, cheer, joy, heaven, delight, and pleasure. Similarly, the emotion 'sad,' i.e., E2 may also be associated with a list L2 of predefined keywords, such as depress, cheerless, heartbreaking, sadden, discouraged, dislike, and bad. Similarly, each emotion in the set of emotions may be associated with a predefined list of keywords, wherein each such keyword is indicative of that emotion. Therefore, it may be understood that for each Ei, a list Li of predefined keywords associated with the emotion Ei is generated. This list Li of predefined keywords may contain words that are most likely to occur in multimedia files.

Further, it may be understood that the list Li of predefined keywords may include keywords from more than one languages. For example, the list of predefined keywords associated with the emotion 'sad' may also include Hindi words such as, dukh, mayus, niraash, naakhuss, and gum. Therefore, it may be understood that the lists Li of predefined keywords are exhaustive in nature and may therefore include all words relevant to a particular emotion from several languages. In one example, the set of emotion along with the associated list of predefined keywords are stored in the system database 224.

In one embodiment, the mood detection module 212 may fetch one or more emotion tags from the system database 224 for allocation to the records. In one embodiment, the emotion tags are allocated/assigned to the records by comparing the words present in the records with the keywords present in each of the list of predefined keywords. For example, if the post by the user on the social media 302 is—"I am happy as I bought a new car," then all the words present in this post are compared with all keywords present in all the lists of predefined keywords. Upon comparison, it may be determined that the user is happy and excited.

Similarly, records in the stream database 220 may be assigned emotions tags to determine the mood of the user. In one implementation, each value of a health parameter determined by each biological sensor 304 is attached to an emotion. For example, a sphygmomanometer attached to a user U1 may record blood pressure of the user at multiple time intervals. The blood pressures bp1, bp2, bp3, to bpn may be linked to emotions E1, E2, E3, to En, respectively. At time T1, the user U1 having a blood pressure bp2 may have an emotion E2. Similarly, each value determined by each biological sensor is linked to an emotion. Therefore, for each biological sensor, a following table may be generated and stored in the system database 224. In the present implementation, the emotions for each of these health parameters are determined based upon certain standard scientific calculations.

TABLE 1

Biological parameters and associated emotions

| S. No. | Health Parameter's Values | Emotion |
|---|---|---|
| 1. | HP1 | E1 |
| 2. | HP2 | E2 |
| 3. | HPn | En |

It may be understood that some values of a health parameter may be tagged to a same emotion. Therefore, multiple biological sensors 304 are used to determine exact emotion of the user. A correlation among various health parameters helps to identify correct emotion of the user at any instance. For example, if a majority of biological sensors 304 are indicating towards an emotion E4, then emotion E4 may be construed to be the emotion of the user.

As and when the emotion tags are allocated to a record, a status of the same is maintained in a record document. The record document is updated after every predefined time interval, such as 1 hour or 2 hours. In one example, the record document captures history of every allocation of emotion tag to every record for every user with a time stamp. An example of the record document for user Ui is shown below:

Record Document

| Time Stamp | | Emotion Tag |
|---|---|---|
| 14/04/2012 | 8:00:00 | E1, E4 |
| 14/04/2012 | 9:00:00 | E2 |
| 14/04/2012 | 10:00:00 | E2, E4 |
| 14/04/2012 | 11:00:00 | E1 |
| 14/04/2012 | 12:00:00 | E4, E6 |

Based upon the emotion tags allocated to the records, the mood of the user may be determined. For example, if emotion tags 'happy' and 'excited' are allocated to the records, the mood of the user may be determined to be 'happy' and 'excited.'

TAG ALLOCATION MODULE

After determining the mood of the user, the next step is to allocate emotion tags to the multimedia files available online and/or offline in order to generate a playlist of multimedia files suitable to the mood of the user. A working of the tag allocation unit, may be explained in reference to FIG. 4.

Figure 4:
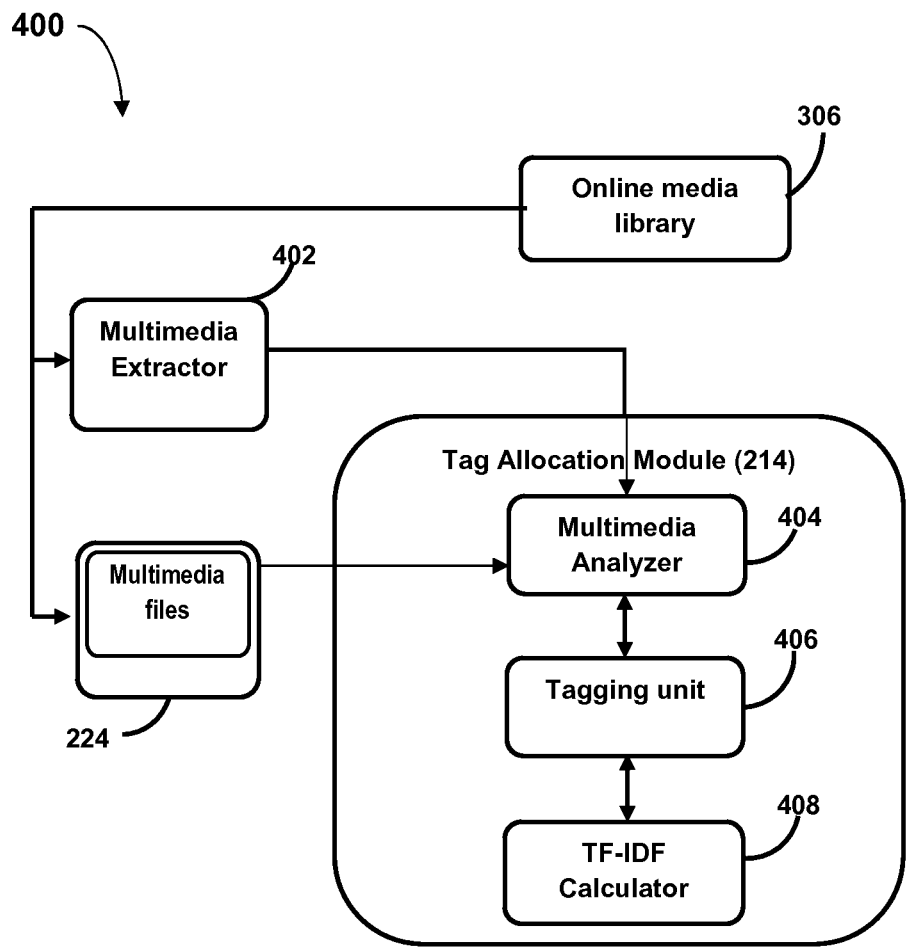
FIG. 4 illustrates a working of a tag allocation module of the media system, in accordance with an embodiment of the present subject matter.

Referring now to FIG. 4, the working of the tag allocation is illustrated, in accordance with an embodiment of the present subject matter. At first, in order to allocate emotion tags to the multimedia files, in one embodiment, the multimedia files may be extracted from the online media library 306 and are stored in the system database 224. In one implementation, the multimedia files are extracted by the multimedia extractor 402. The extracted multimedia files may be stored as M1, M2, to Mn in the system database 224. In another embodiment, the multimedia files may be worked upon without extracting them from the online media library 306. It may be understood that each multimedia file may be either be a song or an audio-visual i.e. video. Further, each multimedia file has certain content in the form of lyrics, subtitles, and dialogues. For example, a song may have lyrics or words as its content.

After extracting and storing the multimedia files in the system database 224, the multimedia analyzer 404 may analyze each multimedia file either by means of keyword spotting techniques or by using lyrics or subtitles of the multimedia file. During the analysis, the multimedia analyzer 404 may create a content document Di which may contain all words present in the multimedia file Mi. In this way, each multimedia file Mi may be associated with a contents document Di containing all words present in the multimedia file Mi. For example, the multimedia file M1 may be associated with a contents document D1 containing all words present in the multimedia file M1. Similarly, multimedia file M2 may be associated with a contents document D2 having all words present in multimedia file M2. In the present embodiment, all the contents documents may be stored in the system database 224.

After the contents document Di are created for each of the multimedia file Mi, the tagging unit 406 may allocate one or more emotion tags present in the set of emotions mentioned above to each of the multimedia file. Specifically, one or more emotion tags may be allocated to the multimedia files based upon a comparison of the words present in contents document with all the lists of predefined keywords associated with various emotion tags. For example, consider a multimedia file such as, a song containing words such as, sorrow, poor, heartbroken, love, and romance. All these words may be stored in a content document. In order to determine an emotion tag suitable for the song, the lyrics of the song present in content document may be compared with all keywords present in all lists of predefined keywords. Based upon the comparison, it may be determined that song is sad and romantic. Therefore, the tagging unit 406 may allocate two emotion tags namely, 'sad' and 'romantic' to this song.

After one or more emotion tags are allocated to the multimedia file, a TF-IDF calculator 408 may assign weights to each of the one or more emotion tags. The weights are assigned based upon relevance of the content of a multimedia file Mi to the one or more emotion tags allocated to the multimedia file Mi. As more than one emotion tags may be allocated to a multimedia file, the TF-IDF calculator 408 may assign a vector Vi (504)=[W1i, W2i, . . . Wmi] to each multimedia file Mi. Here, Wki denotes weight of the emotion tag Ek in the multimedia file Mi (See FIG. 5). A value of these weights may be determined by the TF-IDF calculator 408 by analyzing words in the content document Di of each multimedia file Mi.

For example, a multimedia file M1 may contain some words from list L2 of predefined keywords, few words from list L3 of predefined keywords, however, may contain no words from any other list of predefined keywords. The TF-IDF calculator 408 may apply a technique to determine importance of the words in each list of predefined keywords for multimedia file M1. After applying this technique, the TF-IDF calculator 408 gets a number Wki for each list of predefined keywords. These numbers may be stored in form of vectors [W1i, W2i, . . . Wmi] in the system database 224. The number Wki may indicate importance/relevance of the words in the list Lk (502) for the multimedia file Mi. In other words, the number Wk may determine closeness of an emotion tag Ek to a multimedia file Mi. Higher the number Wki, more relevant the emotion tag Ek for the multimedia content Mi.

Figure 5:
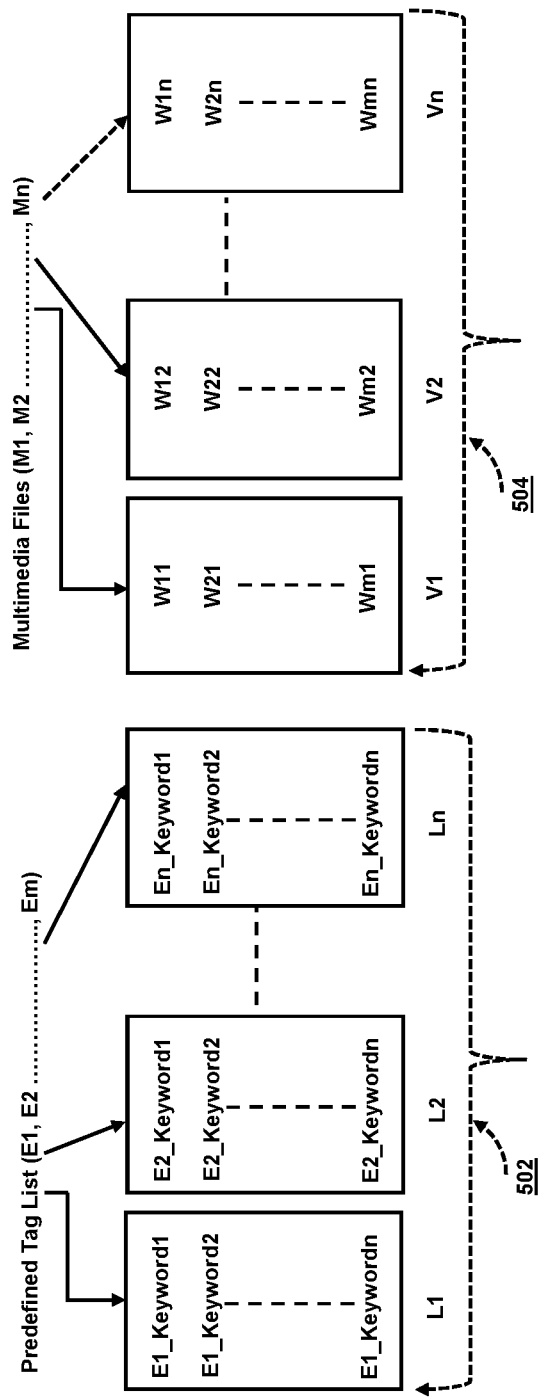
FIG. 5 illustrates weight assignment to the emotion tags allocated to the multimedia files, in accordance with an embodiment of the present subject matter.

In one implementation, the TF-IDF calculator 408 may use the following technique to compute the vector Vi(504)=[W1i, W2i, . . . Wmi] for each multimedia file Mi. Assuming that the media system 102 already has content documents Di for every multimedia file Mi.

tf-idf(D, w)=value of tf-idf calculated for content document D for a word w using TF-IDF calculator 408:

For each Mi, and for each list Lk(502) of predefined keywords, as shown in FIG. 5, Wki=0;

For each word wj in Lk(502)

Wki=Wki+tf-idf(Di, wj)

In other words, an innermost 'for loop' calculates value of Wki as a summation of tf-idf values for content document Di for every word wj in the list Lk(502). Further, a middle 'for loop' calculates the value of Wki for every k in {1, 2, . . . , m}. Furthermore, the middle 'for loop' calculates value of Vi(504)=[W1i, W2i, . . . Wmi] for particular i. Furthermore, an outermost 'for loop' calculates value of Vi(504) for every i in {1, 2, . . . , n}.

Therefore, after execution of the technique defined above, TF-IDF calculator 408 may generate a vector Vi (504)= [W1i, W2i, . . . Wmi] associated with each multimedia file Mi. Here, the number Wki may indicate a degree of relevance of an emotion tag Ek with a multimedia file Mi. Higher the number Wki, more relevant the emotion tag Ek for the multimedia file Mi.

To illustrate the technique defined above, an example may be considered. In this example, a multimedia file X may be assumed to contain some words from list L3 of predefined keywords, few words from list L1 of predefined keywords, however no words from any other list of predefined keywords. Based upon this, TF-IDF calculator 408 may be applied to generate a vector V2(504)=[W12, W22, . . . Wm2]. The TF-IDF calculator 408 guarantees that, W12>0 and W32>0 and Wi2=0 for all i other than 1 and 3. Also W32>W12.

Based upon these values of Wki, it may be determined that the words in the list L3 of the predefined keywords are more important than the words in the list L1 of the predefined keywords for the multimedia file X. In other words, emotion tag E3 is more closely related with multimedia file X. Therefore, it may be understood that higher the number Wki, more relevant the emotion tag Ek for the multimedia file Mi.

PLAYLIST GENERATION MODULE

After categorizing the multimedia files under one or more emotion tags, a playlist of the multimedia files may be generated. In one embodiment, the playlist generation module 216 is adapted to dynamically generate the playlist based upon the inputs from mood detection module 212 and the tag allocation module 214. Specifically, the playlist generation module 216 may be configured to dynamically generate the playlist of multimedia files based upon the mood of the user and the categorization of the multimedia files under one or more emotion tags. In order to dynamically generate the playlist, the playlist generation module 216 may use the record document generated by the mood detection module 212 and the vectors Vi=[W1i, W2i, . . . Wmi] for {i=1, 2, . . . , n} generated by tag allocation module 214.

In one implementation, the playlist generation module 216 may look for the mood of the user in the record document at time T. Based upon the mood, the playlist generation module 216 may fetch multimedia files having same emotion tags as that of the mood and may generate a playlist of the same. As and when the mood of the user changes, the record document may get updated. The updated record document may again be shared with the playlist generation module 216 for updating the playlist generated previously. In this way, the playlist generation module 216 may keep on generating/updating a playlist based upon a current mood of the user.

After the playlist is generated, the I/0 interface 204 may be adapted to display the playlist to the user. The I/0 interface 204 may also present an option to update, export the playlist to external entities such as, multimedia player and user's accounts in online multimedia libraries.

Figure 6:
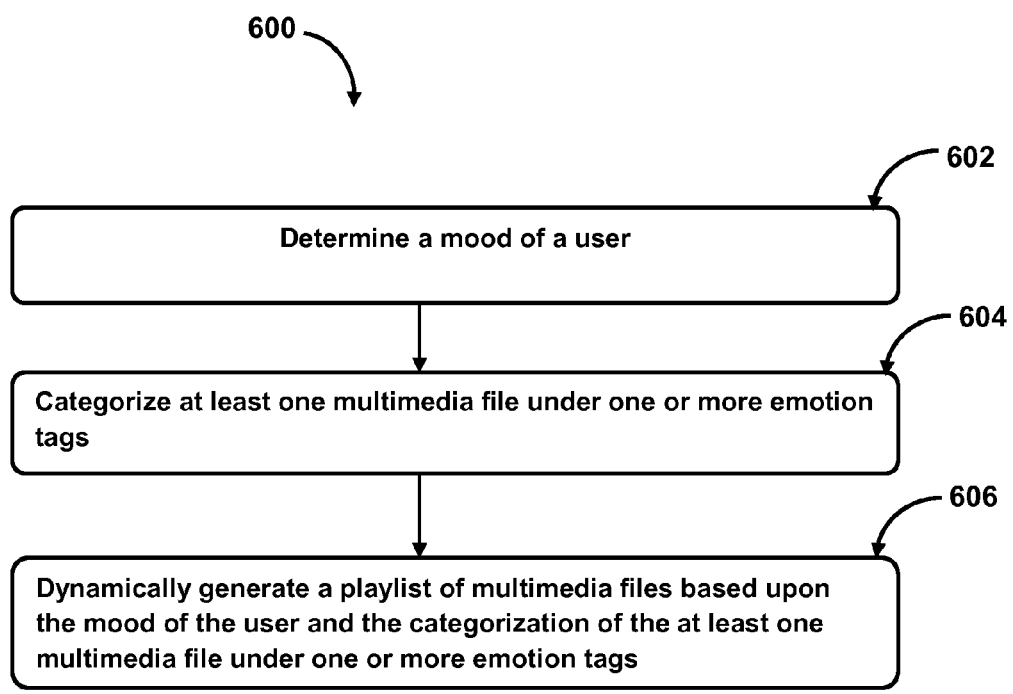
FIG. 6 illustrates a method for dynamically generating a playlist of multimedia files based upon user's mood, in accordance with an embodiment of the present subject matter.

Referring now to FIG. 6, a method 600 for dynamically generating a playlist of multimedia files based upon user's mood is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented in the above described media system 102.

At block 602, a mood of the user may be determined. In one implementation, the mood of the user may be determined by the mood detection module 212. Further, the block 602 may be explained in greater detail in FIG. 7.

At block 604, at least one multimedia file is categorized under one or more emotion tags. In one implementation, the multimedia file may be categorized under one or more emotion tags by the tag allocation module 214. Further, the block 604 may be explained in greater detail in FIG. 8.

At block 606, a playlist of multimedia files is dynamically generated based upon the mood of the user and the categorization of the at least one multimedia file under one or more emotion tags. In one implementation, the playlist of the multimedia files may be generated by the playlist generation module 216.

Figure 7:
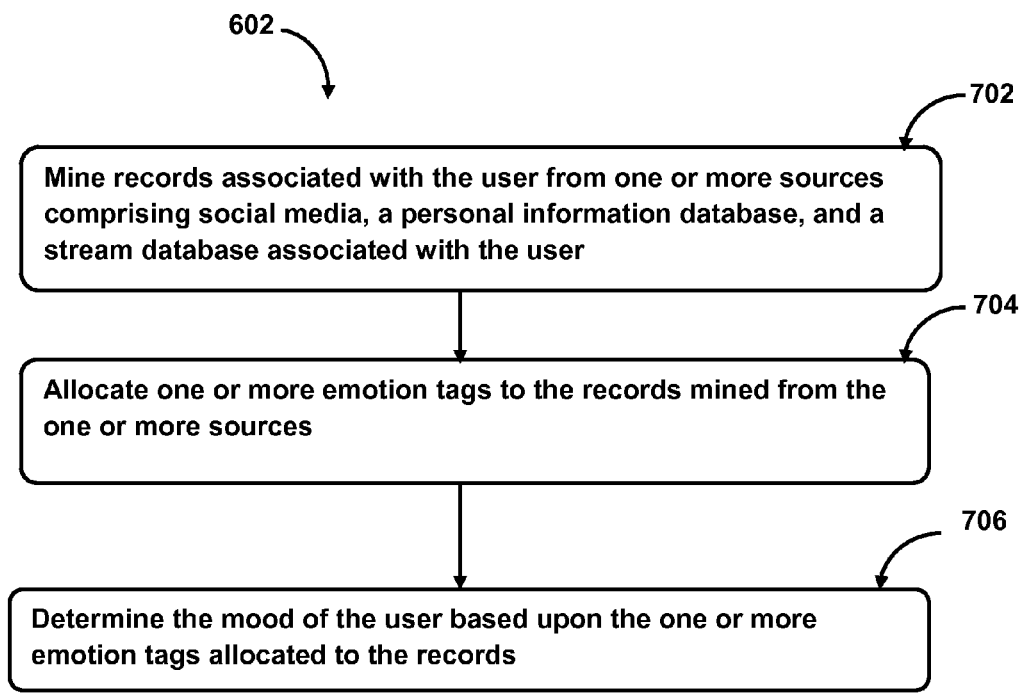
FIG. 7 illustrates a method for determining the mood of the user, in accordance with an embodiment of the present subject matter.

Referring now to FIG. 7, a method 602 for determining the mood of the user is shown, in accordance with an embodiment of the present subject matter.

At block 702, records associated with the user are mined from one or more sources comprising social media 302, a personal information database 222, and a stream database 220 associated with the user. In one implementation, the records are mined by the mood detection module 212.

At block 704, one or more emotion tags are allocated to the records mined from the one or more sources. In one implementation, the one or more emotion tags are allocated by the mood detection module 212.

At block 706, the mood of the user is determined based upon the one or more emotion tags allocated to the records. In one implementation, the mood of the user is determined by the mood detection module 212.

Figure 8:
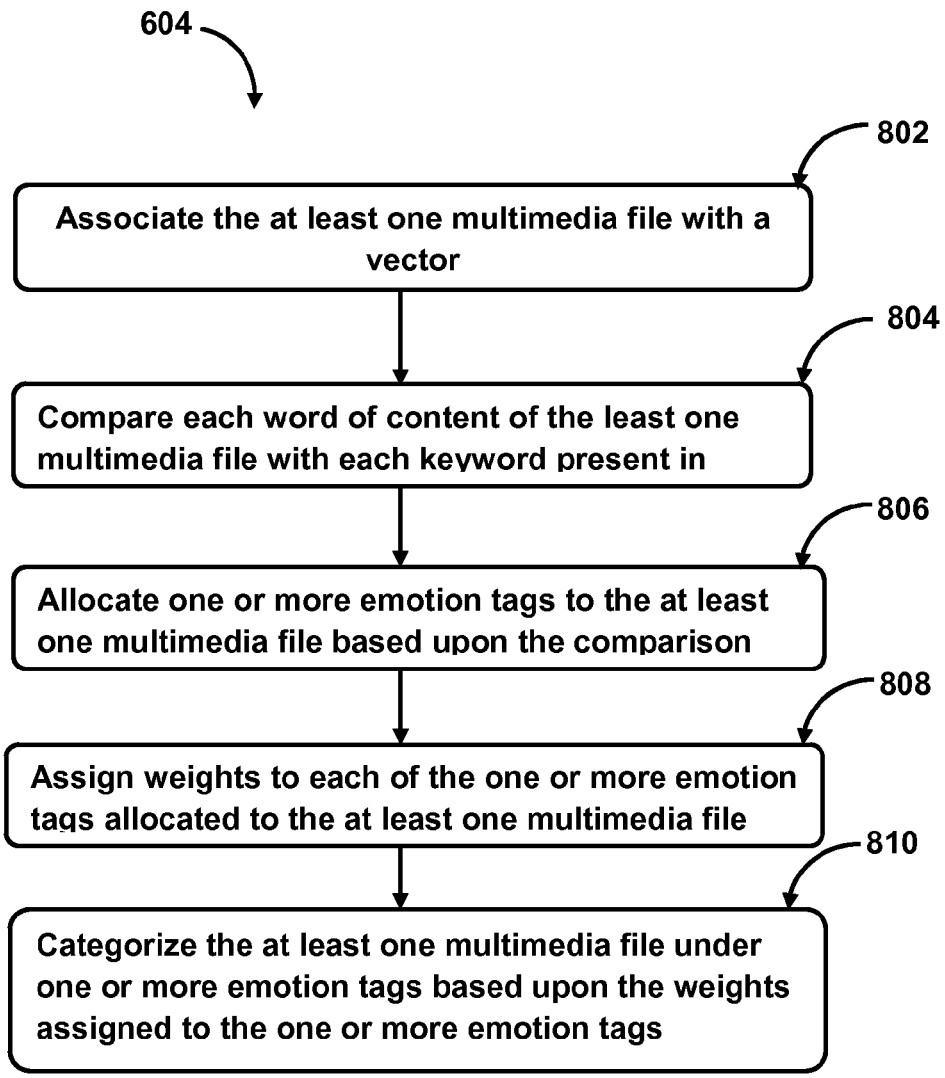
FIG. 8 illustrates a method for categorizing the at least one multimedia file under one or more emotion tags, in accordance with an embodiment of the present subject matter.

Referring now to FIG. 8, a method 604 for categorizing the at least one multimedia file under one or more emotion tags is shown, in accordance with an embodiment of the present subject matter.

At block 802, the at least one multimedia file is associated with a vector. In one implementation, the multimedia file is associated with the vector by the TF-IDF calculator 408 of the tag allocation module 214.

At block 804, each word of content of the least one multimedia file is compared with each keyword present in predefined lists of keywords. The predefined list of keywords is indicative of an emotion. Further, the vector is indicative of a relationship of each word of the at least one multimedia file with the each emotion. In one implementation, the comparison is done by the multimedia analyzer 404 of the tag allocation module 214.

At block 806, one or more emotion tags are allocated to the at least one multimedia file based upon the comparison. In one implementation, the allocation is done by the tagging unit 406 of the tag allocation module 214.

At block 808, weights are assigned to each of the one or more emotion tags allocated to the at least one multimedia file. The weights are assigned based upon relevance of the content of the at least multimedia file to the one or more emotion tags. In one implementation, the weights are assigned by the TF-IDF calculator 408 of the tag allocation module 214.

At block 810, the at least one multimedia file is categorized under one or more emotion tags based upon the weights assigned to the one or more emotion tags. In one implementation, the categorization is done by the TF-IDF calculator 408 of the tag allocation module 214.

Although implementations for methods and systems for dynamically generating a playlist of multimedia files based upon user's mood have been described in language specific to structural features and/or methods, it is to be understood that the appended claims are not necessarily limited to the specific features or methods described. Rather, the specific features and methods are disclosed as examples of implementations for dynamically generating a playlist of multimedia files.

What is claimed is:

1. A system comprising:
   a processor; and
   a memory coupled to the processor for executing a plurality of modules present in the memory, the plurality of modules comprising:
      a mood detection module configured to
         mine records associated with a user from one or more sources comprising at least one of social media, a personal information database, and a stream database associated with the user, wherein the records comprises user activity information on the social media, health parameters of the user and personal information of the user and wherein the stream database comprises information pertaining to the health parameters of the user, and wherein the health parameters are fetched from at least one biological sensor attached to the user for monitoring health of the user;
         compare each word of the records with each keyword present in predefined lists of keywords, wherein each predefined list of keywords is indicative of an emotion;
         allocate one or more emotion tags to the records mined from the one or more sources based on the comparison; and
         determine a mood of the user based upon the one or more emotion tags allocated to the records; and
      a tag allocation module configured to associate at least one multimedia file with a vector;
         compare each word of a content of the at least one multimedia file with each keyword present in the predefined lists of keywords, wherein each predefined list of keywords is indicative of the emotion, and wherein the vector is indicative of a relationship of each word of the at least one multimedia file with the each emotion;
         allocate one or more emotion tags to the at least one multimedia file based upon the comparison;
         assign weights to each of the one or more emotion tags allocated to the at least one multimedia file, wherein the weights are assigned based upon a relevance of the content of the at least one multimedia file to the one or more emotion tags; and
         categorize the at least one multimedia file under one or more emotion tags based upon the weights assigned to the one or more emotion tags; and
      a playlist generation module configured to
         dynamically generate a playlist of multimedia files based upon the mood of the user and the categorization of the at least one multimedia file under the one or more emotion tags.

2. The system of claim 1, wherein the social media comprises at least one of social networking websites, review/feedback websites, and blogs being visited by the user.

3. The system of claim 1, wherein the personal information database comprises information pertaining to at least one of age, e-mail, web-browsing history, peers, Rich Site Summary (RSS) feeds, and environment associated with the user.

4. The system of claim 1, wherein the at least one biological sensor comprises at least one of an electro-cardiogram sensor, a piezo film sensor, a thermal sensor, and an electro-encephalogram sensor.

5. The system of claim 1, wherein the mood detection module is further configured to generate a record document for keeping track of the mood of the user after every predefined periodic interval.

6. The system of claim 1, wherein the content of the at least one multimedia file comprises at least one of lyrics, subtitles, and dialogues.

7. The system of claim 1, wherein the relevance of the content of the at least one multimedia file to the one or more emotion tags is determined using a term frequency-inverse document frequency (TF-IDF) technique.

8. A method comprising:

mining records associated with a user from one or more sources comprising at least one of social media, a personal information database, and a stream database associated with the user, wherein the records comprises user activity information on the social media, health parameters of the user and personal information of the user and wherein the stream database comprises information pertaining to the health parameters of the user, and wherein the health parameters are fetched from at least one biological sensor attached to the user for monitoring a health of the user;

comparing each word of the records with each keyword present in predefined lists of keywords, wherein each predefined list of keywords is indicative of an emotion;

allocating one or more emotion tags to the records mined from the one or more sources based on the comparison; and determining a mood of the user based upon the one or more emotion tags allocated to the records;

associating at least one multimedia file with a vector;

comparing each word of a content of the least one multimedia file with each keyword present in the predefined lists of keywords, wherein each predefined list of keywords is indicative of the emotion, and wherein the vector is indicative of a relationship of each word of the at least one multimedia file with the each emotion;

allocating one or more emotion tags to the at least one multimedia file based upon the comparison;

assigning weights to each of the one or more emotion tags allocated to the at least one multimedia file, wherein the weights are assigned based upon a relevance of the content of the at least multimedia file to the one or more emotion tags;

categorizing the at least one multimedia file under the one or more emotion tags based upon the weights assigned to the one or more emotion tags; and dynamically generating a playlist of multimedia files based upon the mood of the user and the categorization of the at least one multimedia file under the one or more emotion tags.

9. The method of claim 8, wherein the social media comprises at least one of social networking websites and blogs being used by the user.

10. The method of claim 8, wherein the personal information database comprises information pertaining to at least one of age, e-mail, web-browsing history, peers, Rich Site Summary (RSS) feeds, and environment associated with the user.

11. The method of claim 8, wherein the at least one biological sensor comprises at least one of an electro-cardiogram sensor, a piezo film sensor, a thermal sensor, and an electro-encephalogram sensor.

12. The method of claim 8, further comprising:

generating a record document for keeping track of the mood of the user after every predefined periodic interval.

13. The method of claim 8, wherein the content of the multimedia file comprises at least one of lyrics, subtitles, and dialogues.

14. The method of claim 8, wherein the relevance of the content of the at least one multimedia file to the one or more emotion tags is determined using a term frequency-inverse document frequency (TF-IDF) technique.

* * * * *